United States Patent [19]
Alleva et al.

[11] Patent Number: 5,710,866
[45] Date of Patent: Jan. 20, 1998

[54] SYSTEM AND METHOD FOR SPEECH RECOGNITION USING DYNAMICALLY ADJUSTED CONFIDENCE MEASURE

[75] Inventors: Fileno A. Alleva, Redmond, Wash.; Douglas H. Beeferman, Hilton Head, S.C.; Xuedong Huang, Redmond, Wash.

[73] Assignee: Microsoft Corporation, Redmond, Wash.

[21] Appl. No.: 452,141

[22] Filed: May 26, 1995

[51] Int. Cl.$^6$ .................................................. G10L 9/00
[52] U.S. Cl. .......................... 395/2.65; 395/2.55
[58] Field of Search .......................... 395/2.6, 2.64, 395/2.65, 2.66, 2.55

[56] References Cited

U.S. PATENT DOCUMENTS

| | | | |
|---|---|---|---|
| 4,817,156 | 3/1989 | Bahl et al. | 381/43 |
| 4,829,577 | 5/1989 | Kuroda et al. | 381/45 |
| 4,829,578 | 5/1989 | Roberts | 381/46 |
| 5,333,236 | 7/1994 | Bahl et al. | 395/2.65 |
| 5,506,933 | 4/1996 | Nitta | 395/2.65 |

OTHER PUBLICATIONS

Huang et al., *Hidden Markov Models for Speech Recognition*, Edinburgh University Press, Edinburgh, U.K., 1990, pp. 1–7, 52–53, 78–97, 111–164, 186–233.

Huang et al., "Unified Stochastic Engine (USE) for Speech Recognition." pp. 186–233.

Alleva et al., "An Improved Speech Algorithm Using Incremental Knowledge for Continuous Speech Recognition," *IEEE International Conference on Acoustics, Speech, and Signal Processing*, 1993.

Hwang et al., "Predicting Unseen Triphones With Senones," *IEEE International Conference on Acoustics, Speech, and Signal Processing*, 1993.

Bahl et al., "Decision Trees for Phonological Rules in Continuous Speech," *IEEE International Conference on Acoustics, Speech, and Signal Processing*, 1991.

Hon et al., "CMU Robust Vocabulary–Indpendent Speech Recognition System," *IEEE International Conference on Acousticc, Speech, and Signal Processing*, 1991.

*Primary Examiner*—Fan Tsang
*Attorney, Agent, or Firm*—Seed and Berry LLP

[57] ABSTRACT

A computer-implemented method of recognizing an input speech utterance compares the input speech utterance to a plurality of hidden Markov models to obtain a constrained acoustic score that reflects the probability that the hidden Markov model matches the input speech utterance. The method computes a confidence measure for each hidden Markov model that reflects the probability of the constrained acoustic score being correct. The computed confidence measure is then used to adjust the constrained acoustic score. Preferably, the confidence measure is computed based on a difference between the constrained acoustic score and an unconstrained acoustic score that is computed independently of any language context. In addition, a new confidence measure preferably is computed for each input speech frame from the input speech utterance so that the constrained acoustic score is adjusted for each input speech frame.

30 Claims, 7 Drawing Sheets

Fig. 3A - Input Frame - 56

Fig. 3B - Vector Quantizing Table - 22

| Codewords | 0 | 1 | 2 | 3 | ... | 255 |
|---|---|---|---|---|---|---|
| Gaussian density functions | | | | | ... | |

Fig. 3C
Quantized Input Frame - 58

| .15 | .14 | .08 | .07 | ... | .08 |
|---|---|---|---|---|---|

Fig. 3D - Senone Table - 26

| Senone 1 | .2 | .05 | 0 | .1 | ... | .02 |
|---|---|---|---|---|---|---|
| Senone 2 | .03 | .08 | .04 | .18 | ... | .05 |
| Senone 3 | .1 | .1 | .02 | .04 | ... | .06 |
| ... | | | | | | |

Fig. 3E - Hidden Markov Model

Fig. 3F

| | | To State | | | |
|---|---|---|---|---|---|
| | | 1 | 2 | 3 | 4 |
| From State | 1 | .6 | .4 | 0 | 0 |
| | 2 | 0 | .5 | .5 | 0 |
| | 3 | 0 | 0 | .7 | .3 |
| | 4 | 0 | 0 | 0 | 0 |

| Frame | State 1 | | | | | | | State 2 | | | | | | State 3 | | | | | |
|---|---|---|---|---|---|---|---|---|---|---|---|---|---|---|---|---|---|---|---|
| | $IUAS_t$ | $UAS_t$ | $SS_t$ | $ICAS_t$ | $CAS_t$ | $CM_t$ | $ACAS_t$ | $SS_t$ | $ICAS_t$ | $CAS_t$ | $CM_t$ | $ACAS_t$ | $SS_t$ | $ICAS_t$ | $CAS_t$ | $CM_t$ | $ACAS_t$ |
| 0 | 1.0 | | | 1.0 | 1.0 | | 1.0 | | | 0 | | 0 | | | 0 | | 0 |
| 1 | .8 | .8 | .7 | 1.0 | .7 | .88 | .69 | .6 | 0 | 0 | | 0 | .6 | 0 | 0 | | 0 |
| 2 | .85 | .68 | .6 | .41 | .25 | .37 | .23 | .8 | .28 | .22 | .32 | .2 | .7 | 0 | 0 | | 0 |
| 3 | .85 | .54 | .5 | .14 | .07 | .13 | .06 | .7 | .1 | .07 | .13 | .06 | .8 | .1 | .08 | .14 | .07 |
| ... | | | | | | | | | | | | | | | | | |

$IUAS_t$ = highest senone score at time frame t
$UAS_t$ = $UAS_{t-1}$ * $IUAS_t$
SS = state senone score
$ICAS_t$ = MAX ($a_{i,j}$ * $ACAS_{t-1,j}$)
$a_{i,j}$ = transition probability of transitioning to current state j from previous state i
$CAS_t$ = $ICAS_t$ * SS
$CM_t$ = $CAS_t / UAS_t$
$ACAS_t$ = $CAS_t$ * $CM_t^K$
K = 0.1 (an empirically-determined constant)

SYSTEM AND METHOD FOR SPEECH RECOGNITION USING DYNAMICALLY ADJUSTED CONFIDENCE MEASURE

TECHNICAL FIELD

The present invention relates generally to computer-implemented speech recognition and, more specifically, to a system and method for employing a dynamically-adjusted confidence measure during recognition.

BACKGROUND OF THE INVENTION

There has long been a desire to have machines capable of recognizing human speech, such as machines capable of obeying human commands and machines capable of transcribing dictation. Such machines would greatly increase the speed and ease with which humans communicate with computers, and the speed and ease with which humans record and organize their own words and thoughts.

Most present speech recognition systems operate by comparing an acoustic description of a speech utterance to acoustic models created based on utterances spoken by trainers. In many such systems, the analog acoustic signal generated by the utterance is divided into speech flames. Each speech frame is converted into a digital signal representing amplitudes of the speech frame. The digital signal is converted into a frequency domain signal that represents the amplitude of the acoustic signal at various frequency bands. Such systems commonly recognize the utterance by comparing the resulting sequence of speech flames to an acoustic model of each word in the vocabulary of the system.

Originally, the performance of such recognition systems was poor, because the sounds of a given word are rarely, if ever, spoken in exactly the same speed or manner. However, a technique known as hidden Markov modeling has been developed which greatly improves the performance of such systems. Hidden Markov modeling recognizes an utterance by determining the probabilities that the utterance corresponds to each acoustic model (hidden Markov model) in the vocabulary. Hidden Markov modeling not only compares the amplitudes of the individual frequency bands for an input speech frame to the expected amplitudes of the hidden Markov models, but also compares the deviation between the actual and expected amplitudes to the expected deviation. Such probabilistic recognition provides a much greater ability to deal with the variations in utterances of the same word, and provides a much greater ability to deal with noise commonly present during speech recognition.

In such a speech recognition system, a hidden Markov model is established for each word in the vocabulary. Each hidden Markov model is represented by a state diagram (states and transitions between the states are defined). A state in a hidden Markov model is associated with a set of acoustic models that represent average frequency distributions of various training utterances of the word modeled by the hidden Markov model. One example of such an acoustic model is known as a senone, which allows speech information to be shared across many words.

An utterance is recognized as the word corresponding to the hidden Markov model resulting in a highest combined recognition score. The combined recognition score for each hidden Markov model is determined by summing incremental combined recognition scores computed for each speech frame of the utterance. Each incremental combined recognition score is computed based on a transition probability and an output probability for the speech frame. The output probability for a speech frame is the probability that the speech frame is matched by one of the senones in the set of senones associated with a given state. The transition probability refers to the probability that the speech frame will transition from one state to another or from one state back to itself. The transition probabilities are estimated statistically based on an average number of transitions taken by the training utterances used to create the hidden Markov model.

Although the use of hidden Markov models has greatly improved speech recognition, prior art computer-based speech recognizers remain far less accurate than the ability of humans to recognize speech. Computer-based speech recognizers fair even worse when attempting to recognize continuous speech, that is, full sentences of speech. The inventors of the present invention have recognized that one problem with prior art speech recognizers is that the acoustic matching of the input speech utterance with the hidden Markov models scores each hidden Markov model relative to the other hidden Markov models without measuring the scores relative to an absolute best matching score. As a result, the inventors found that in prior art speech recognizers the scores for hidden Markov models that do not match the input speech utterance well are too high and result in inaccurate speech recognition.

Another problem with prior art speech recognizers is caused by their use of a "language weight." Prior art speech recognizers compute a linguistic score based on various language models that provide linguistic probabilities based on the vocabulary and/or grammar used by speakers of a given language. For example, a language model of the English language would assign a low probability to uncommon word sequences, such as one noun immediately following another noun, and would assign a higher probability to common word sequences, such as an adverb following a verb. The language weight is used to bias the speech recognition to favor the acoustic score more than the linguistic score or vice versa.

Most prior art speech recognizers use a single constant language weight that is independent of any specific acoustic or language information. However, one prior speech recognition system, known as the Unified Stochastic Engine system, uses a variable language weight that varies based on the particular words spoken during training. As such, the Unified Stochastic Engine system uses a language weight that varies based solely on the statistics computed for the training words that are used to create the language model. However, the training words do not always accurately represent the actual words being recognized, so the inventors recognized that varying the language weight based solely on such training words may be inaccurate.

A third problem with prior art speech recognizers is their use of an insertion penalty that is a constant. The insertion penalty is used to bias the speech recognition against finding too many words to match an input speech utterance of a given length. For example, if an input speech utterance is two seconds in length, it is highly unlikely that thirty words were spoken in the two seconds, so the insertion penalty would bias the speech recognizer to recognize fewer words in the two-second time period. The inventors recognized that by keeping the insertion penalty constant the prior art speech recognizers fail to take into account how accurately the hidden Markov models match the input speech utterance.

SUMMARY OF THE INVENTION

The present invention is directed to a computer-implemented method of recognizing an input speech utterance. The method compares an input speech utterance to a plurality of hidden Markov models to obtain a constrained acoustic score for each hidden Markov model that reflects the probability that the hidden Markov model matches the input speech utterance. The method computes a confidence measure for each hidden Markov model that reflects the probability of the constrained acoustic score being correct. The computed confidence measure is then used to adjust the constrained acoustic score. Preferably, the confidence measure is computed based on a difference between the constrained acoustic score and an unconstrained acoustic score that is computed independently of any language context. Adjusting the constrained acoustic score using the confidence measure provides a more accurate recognition of the input speech utterance.

In the preferred embodiment, the speech recognition method computes a linguistic score for each hidden Markov model that reflects a probability that a linguistic expression corresponding to the hidden Markov model matches a linguistic expression in a predetermined language model. The speech recognition method determines the most closely matching linguistic expression based on a combination of the constrained acoustic score and the linguistic score that is weighted by a variable language weight. The language weight is varied dynamically according to the computed confidence measure.

Preferably, the speech recognition method also employs a variable insertion penalty to bias the method against recognizing the input speech utterance to be a linguistic expression with an excessive number of words. The speech recognition method varies the insertion penalty for each hidden Markov model based on the confidence measure and the language weight computed for the hidden Markov model. By varying the language weight and the insertion penalty based on the dynamically computed confidence measure, the language weight and insertion penalty are based on the actual input speech utterance, and thus are more likely to produce accurate speech recognition.

BRIEF DESCRIPTION OF THE DRAWINGS

Shown at FIG. 3A is an example of an input speech frame that includes magnitude values for each of 128 frequency bands.

Shown in FIG. 3B is a vector quantizer table which stores 256 codewords and corresponding Gaussian probability density functions that were obtained from the training speech data to effectively model the entire speech spectrum.

Shown in FIG. 3C is and example of a quantized input speech frame frame.

Shown in FIG. 3D is a senone table that stores a database of senones.

Shown in FIG. 3E is an example of a hidden Markov model that includes five states with the transitions between states noted by the lines with arrows.

DETAILED DESCRIPTION OF THE INVENTION

The present invention is directed to a computer-implemented method and system of recognizing an input speech utterance. In a preferred embodiment, the system divides the input speech utterance into a sequence of input speech frames and determines a frequency distribution for each input speech frame. The system compares the sequence of input speech frames to a plurality of hidden Markov models to obtain a constrained acoustic score for each hidden Markov model. Each hidden Markov model employs a state diagram to represent model sequences of speech frames for the word being modeled by the hidden Markov model. As such, the constrained acoustic score reflects the probability that one of the model sequences of the hidden Markov model matches the sequence of input speech frames.

In the preferred embodiment, the system computes a confidence measure for each hidden Markov model that reflects the probability of the constrained acoustic score being correct. The computed confidence measure is then used to adjust the constrained acoustic score. Preferably, the confidence measure is computed based on a difference between the constrained acoustic score and an unconstrained acoustic score that is computed independently of any language context. In particular, the unconstrained acoustic score is an accumulation of the best acoustic score for each input speech frame regardless of the sequential order of the input speech frames. The best acoustic score for each input speech frame reflects the probability of the input speech frame matching whichever model speech frame (e.g. senone) is closest to the input speech frame. Adjusting the constrained acoustic score using the confidence measure provides a more accurate recognition of the input speech utterance.

Figure 1:
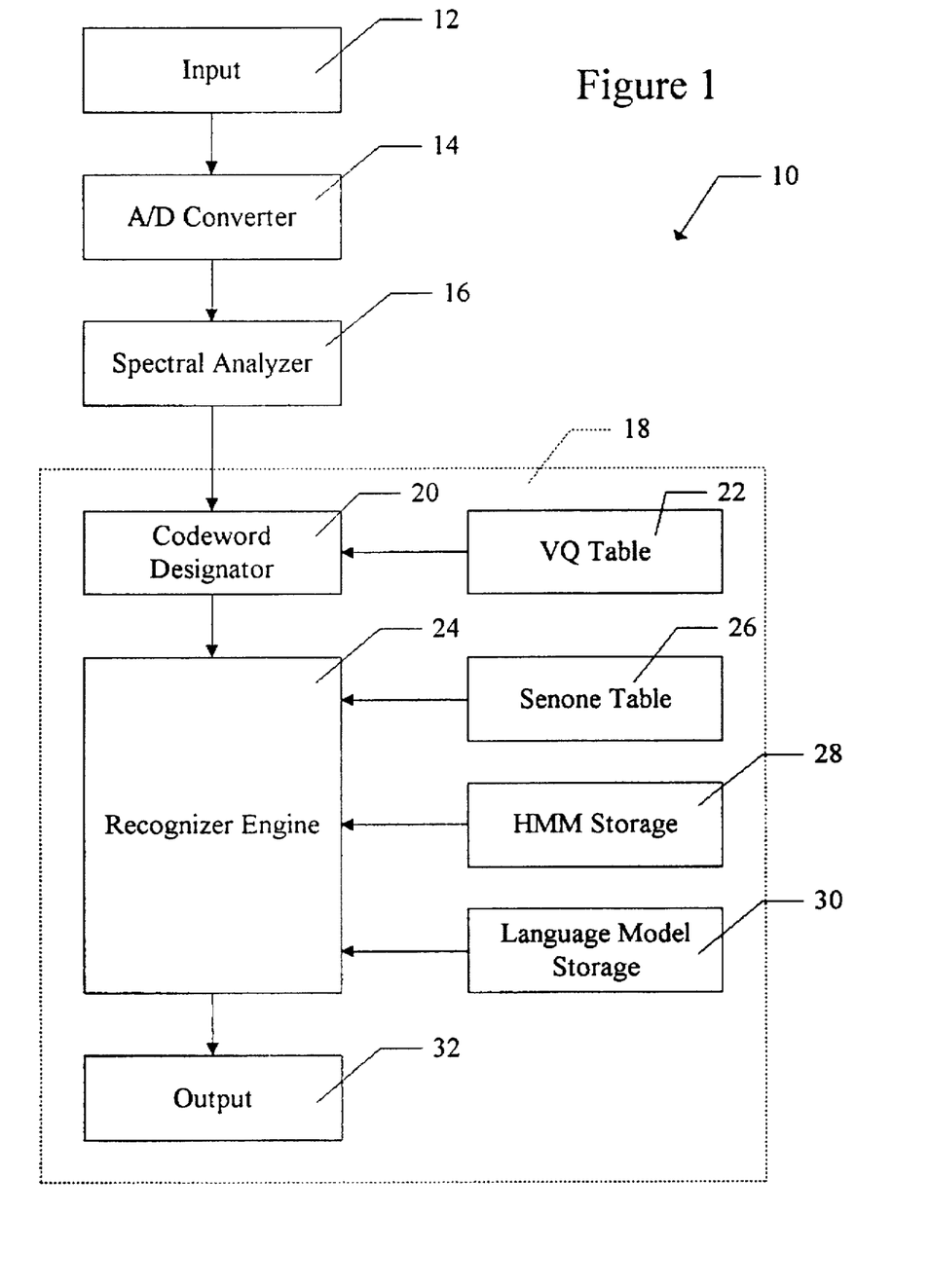
FIG. 1 is a speech recognition system 10 for use in performing the speech recognition method of the present invention.

Shown in FIG. 1 is a speech recognition system 10 for use in performing the speech recognition method of the present invention. The speech recognition system 10 includes an input device 12, such as a microphone, that receives an input speech utterance from a user and converts the input speech utterance to an electrical analog signal. The analog signal is passed to an analog/digital (A/D) converter 14 which transforms the analog signal into a sequence of digital samples. The sequence of digital samples is passed to a spectral analyzer 16 that performs spectral analysis to compute a magnitude value for each frequency band of a frequency spectrum. The spectral analyzer can be any conventional processor that performs known methods of spectral analysis, such as Fast Fourier transforms, linear predictive coding, and cepstral coefficients. Preferably, the spectral analysis is performed every ten milliseconds to divide the utterance into input speech frames representing ten milliseconds of the utterance.

Each input speech frame is transmitted to a data processor 18 which can be any conventional computer such as a desktop personal computer. The data processor 18 includes a codeword designator 20 that receives each input speech frame and compares the input speech frame to numerous acoustic feature models, known as Gaussian probability density functions, that are represented by codewords in a vector quantization (VQ) table 22. In a preferred embodiment, there are 256 codewords in the VQ table 22 that are chosen to adequately cover the entire human speaking range. Each codeword is a vector that includes average values for approximately 128 frequency bands. The codeword designator assigns the input speech frame a speech frame vector having a probability value for each of the 256 codewords according to well-known methods. The probability value for each codeword represents the probability that the Gaussian probability density function corresponding to the codeword matches the input speech frame.

The sequence of quantized input speech frames is passed to a recognizer engine 24 that recognizes the utterance as a linguistic expression. Like the utterance, the linguistic expression can be a word, sentence, or any other portion of speech. The recognizer engine 24 performs speech recognition using a senone table 26, a hidden Markov model (HMM) storage unit 28, and a language model storage unit 30, as discussed in more detail below. The linguistic expression recognized by the recognizer engine 24 is displayed using an output device 32, such as a conventional computer monitor or a printer.

To recognize the input speech utterance, the system preferably employs a modified version of the well-known Bayes formula as follows in Equation 1.

$$P(W/X) = P(X/W) P(W)^\alpha \beta^N \quad \text{Equation 1}$$

The P(W/X) is referred to herein as the combined recognition score (CRS) and is defined as the probability that the linguistic expression W will be output from the speech recognizer given the acoustic observation X. The P(X/W) is referred to herein as the constrained acoustic score (CAS) and is defined as the probability that when a speaker says the word string W the acoustic observation X will be observed. The P(W) is referred to herein as the linguistic score (LS) and is defined as the a priori probability that the word string W will be uttered. The $\alpha$ is referred to herein as the language weight (LW) and is used to bias the weight of the language score relative to the constrained acoustic score in determining the combined recognition score. The $\beta$ is referred to herein as the insertion penalty (IP) and N is the number of words in the word string W. Each of the terms will be discussed in more detail below.

Equation 1 can be rewritten with the terms used herein as follows:

$$CRS = (CAS) (LS)^{LW} (IP)^N \quad \text{Equation 2}$$

A combined recognition score (CRS) is computed for each hidden Markov model (HMM) in the HMM storage unit 28. The linguistic expression associated with the HMM that results in the highest combined recognition score is output as the recognized input speech utterance. It should be appreciated that the linguistic expression can be a single word modeled by a single HMM, an entire sentence modeled by a single HMM, or an entire sentence modeled by multiple HMMs.

Figure 2:
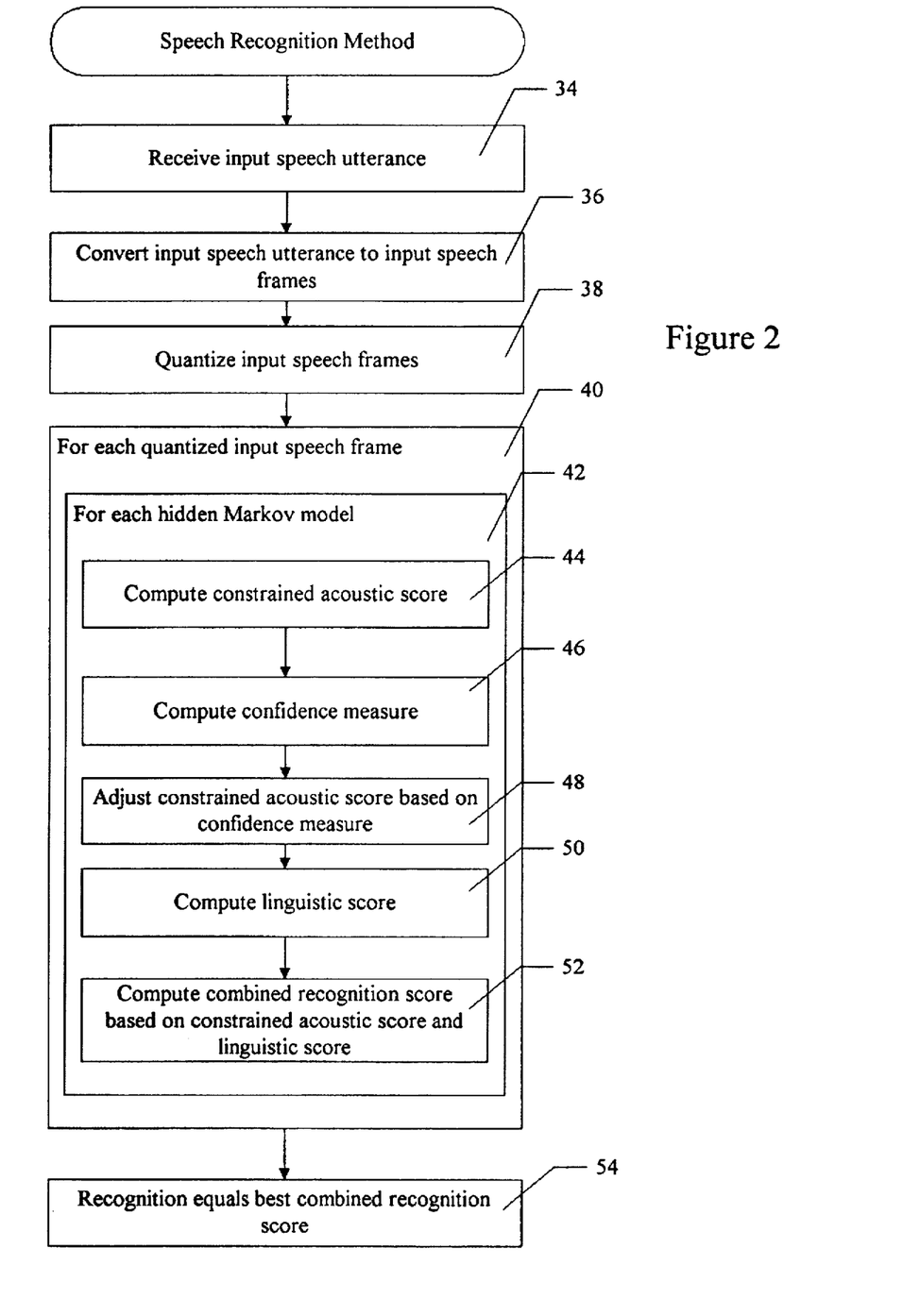
FIG. 2 is a flow diagram of a preferred speech recognition method of the present invention.

Shown in FIG. 2 is a flow diagram of a preferred speech recognition method of the present invention. In step 34, the method receives an input speech utterance from a user via the input device 12. In step 36 the input speech utterance is converted into a sequence of input speech frames using the A/D converter 14 and the spectral analyzer 16. In step 38, the method quantizes the input speech frames using the codeword designator 20 and the vector quantization table 22. As discussed above, each quantized input speech frame includes a probability value for each of 256 codewords representing Gaussian probability density functions. As is well known in the art, the quantizing step is used to efficiently reduce the amount of data used to recognize the input speech utterance. The present invention is equally applicable regardless of whether vector quantization is employed.

In step 40 the method performs steps 42–52 for each quantized input speech frame. In step 42 the method performs steps 44–52 to obtain a combined recognition score for each HMM in the HMM storage unit 28. Each HMM models a defined portion of speech, such as a sentence, word, or phoneme. Each HMM includes a plurality of states with each state describing a very short acoustic event, usually one to a few ten millisecond speech frames. Each state includes one or more senones that represent the speech frames that were spoken during training when creating the HMM. Each HMM also includes transitions between states with a transition probability defined for each transition.

In step 44 the method computes a constrained acoustic score for each HMM based on output probabilities and transition probabilities determined for a current state of the HMM. There are several well-known algorithms for computing such a constrained acoustic score such as the forward-backward algorithm or the Viterbi algorithm. Such algorithms are discussed in more detail in Huang, et al., *Hidden Markov Models For Speech Recognition*, Edinburgh University Press, 1990, which is incorporated by reference herein in its entirety. The step of computing a constrained acoustic score will be discussed in more detail below with respect to the example shown in FIG. 3 and the flow diagram shown in FIG. 4.

In step 46 the method computes a confidence measure for each HMM. The confidence measure is a measure of how close the constrained acoustic score is to the best possible matching score for the input speech frame. The step of computing a confidence measure is discussed in more detail below with respect to the example shown in FIG. 3 and the flow diagram shown in FIG. 5.

In step 48 the method adjusts the constrained acoustic score computed in step 44 based on the confidence measure computed in step 46. Equation 3 below specifies how to adjust the constrained acoustic score where CAS refers to the constrained acoustic score, ACAS refers to the adjusted constrained acoustic score, CM refers to the confidence measure, and K equals a constant.

$$ACAS = CAS * CM^K \quad \text{Equation 3}$$

The value of the constant K is determined by trial and error based on the training dataset used to create the HMMs and can be adjusted as necessary to provide optimum recognition accuracy.

In step 50 the method computes a linguistic score based on the language model stored in the language model storage unit 30. Language models typically are bigram language models, meaning that the linguistic score is based on the probability of one word being followed by a particular second word. For example, there is a high probability that "Shetland" will be followed by "pony" and there is a low probability that "Shetland" will be followed by "alligator." Alternatively, the language model may be based on N-grams other than bigrams or even on sub-word language probabilities. In addition, other lexical knowledge such as syntax and grammatical rules can be employed to create the language model. Methods for creating language models are well-known in the art and are described in more detail in the Huang et al. book referred to above.

In step 52 the method computes a combined recognition score based on the constrained acoustic score as adjusted in step 48 and the linguistic score computed in step 50. The computation of a combined recognition score is based on the modified Bayes formula shown above in Equation 2. In step 54, the method recognizes the input speech utterance as being the linguistic expression corresponding to the HMM with the best combined recognition score.

Figure 3A:
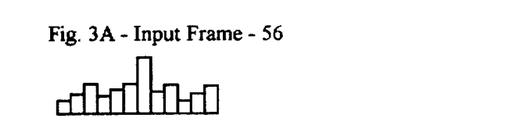
Figures 3B, 3C:
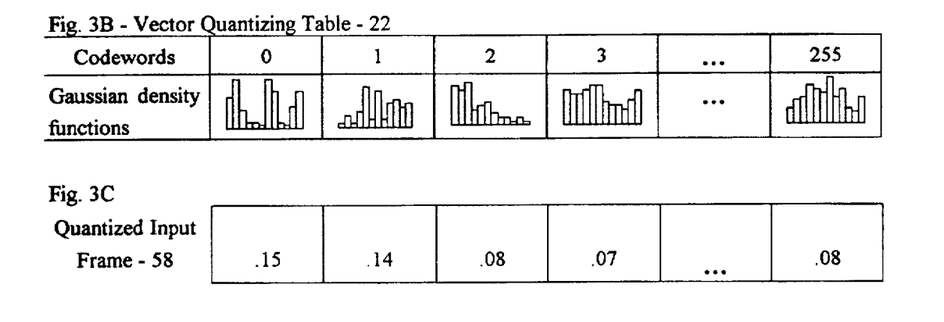

FIGS. 3A–3G depict an example showing how a constrained acoustic score is computed and adjusted based on a computed confidence measure. Shown in FIG. 3A is an example of an input speech frame that includes magnitude values for each of 128 frequency bands. The input speech frame is the result of the input speech utterance being converted to digital samples by the A/D converter 14 into a digital signal that is converted into the frequency domain signal by the spectral analyzer 16. Shown in FIG. 3B is a vector quantizer table which stores 256 codewords and corresponding Gaussian probability density functions that were obtained from the training speech data to effectively model the entire speech spectrum. The input speech frame is compared to each of the Gaussian density functions in the vector quantizing table, which results in a quantized input speech frame such as the one shown in FIG. 3C. The quantized input speech frame includes a probability value for each of the 256 codewords, each probability value representing the probability of matching the Gaussian probability density function associated with the codeword.

Figure 3D:
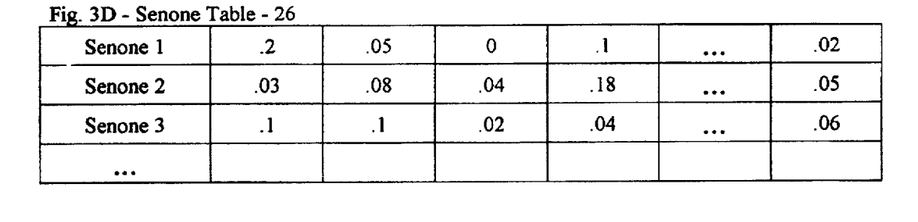

Shown in FIG. 3D is a senone table that stores a database of senones. Typically, a senone table stores several thousand senones depending on the number of words spoken during training. Like the quantized input speech frame shown in FIG. 3C, each senone includes a probability value for each of the 256 codewords of the vector quantizing table. The senone table is created in a well-known manner using the training speech data prior to recognizing any input speech utterances. The creation of a senone table is discussed in more detail in Hwang, M. Y. and Huang, X., "Shared-Distribution Hidden Markov Models For Speech Recognition," *IEEE Transactions on Speech and Audio Processing*, Vol. 1, No. 10, 1993, which is incorporated herein by reference in its entirety.

Figure 3E:
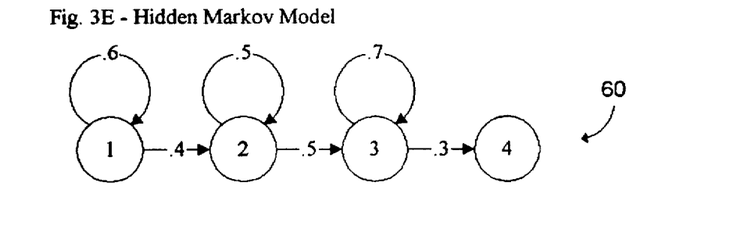

As discussed above with respect to FIG. 2, the method computes a constrained acoustic score for each HMM and that constrained acoustic score is adjusted based on a computed confidence measure. Shown in FIG. 3E is an example of a HMM that includes four states with the transitions between states noted by the lines with arrows. Each state includes one or more of the senones from the senone table shown in FIG. 3D. The specific senones in each state depends on the speech times spoken in the training words for the linguistic expression corresponding to the HMM. For example, assuming that the HMM shown in FIG. 3E models the word "dog" and the first state includes senone 3. That means that at least one of the training speakers spoke the word "dog" using a speech frame that was quantized into senone 3. The numbers on each transition arrow between the states of the HMM are the transition probabilities for the respective transitions. For example, the first state has a 0.6 probability of returning to the first state and a 0.4 probability of transitioning to the second state. That means that, on average, after speaking a speech frame corresponding to a senone in the first state, 60% of speakers would speak a second speech frame corresponding to another of the senones (or the same senone) in the first state while 40% of the speakers would speak a second speech frame corresponding to one of the senones in the second state.

Figure 3F:
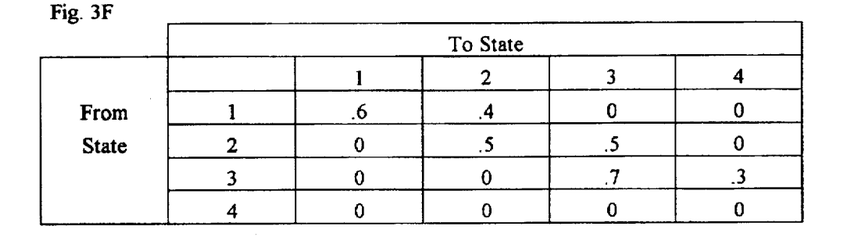
FIG. 3F is a table that shows exemplary values computed to obtain an adjusted constrained acoustic score (ACAS) for each input speech frame.

FIG. 3F shows, in tabular format, the transition probabilities of the hidden Markov model shown in FIG. 3E. Note that the table of FIG. 3F includes a transition probability value for every transition between the states of the hidden Markov model. For clarity, the transitions having a transition probability of zero are not depicted on the hidden Markov model of FIG. 3E. A hidden Markov model could have a non-zero probability for every possible transition between states.

The constrained acoustic score for the HMM for the first input speech frame equals the output probability for the first state. The output probability is the probability of one of the senones in the first state matching to the quantized input speech frame. Such a computation of the output probability is well-known in the art.

After the constrained acoustic score is computed for the first input speech frame, the confidence measure for that input speech frame is computed. In a preferred embodiment, the confidence measure equals the ratio between an unconstrained acoustic score and the constrained acoustic score. The unconstrained acoustic score is determined by finding the senone in the senone table that has the highest probability of matching the input speech frame. To find the senone with the highest probability, each codeword of the quantized input speech frame is compared to a corresponding codeword of each senone. For example, the probability score for senone 1 of the senone table shown in FIG. 3D with respect to the quantized input speech frame shown in FIG. 3C is determined by computing the vector distance between each corresponding codeword. For the first codeword, the vector distance is 25 ($(20-15)^2$) and for the second codeword, the vector distance is 81 ($(5-14)^2$). The distance is then multiplied by the statistical variance to obtain a codeword matching value for the codeword. The statistical variance is a well-known statistical term that refers to the square of the standard deviation determined from the training data. After computing the vector distance for each codeword and multiplying it by the statistical variance for each codeword to obtain a codeword matching value for each codeword, the codeword matching values are added together to obtain a senone score for the senone. The method determines the highest senone score for the input speech frame and accumulates the best senone scores for each input speech frame as the unconstrained acoustic score.

Figure 3G:
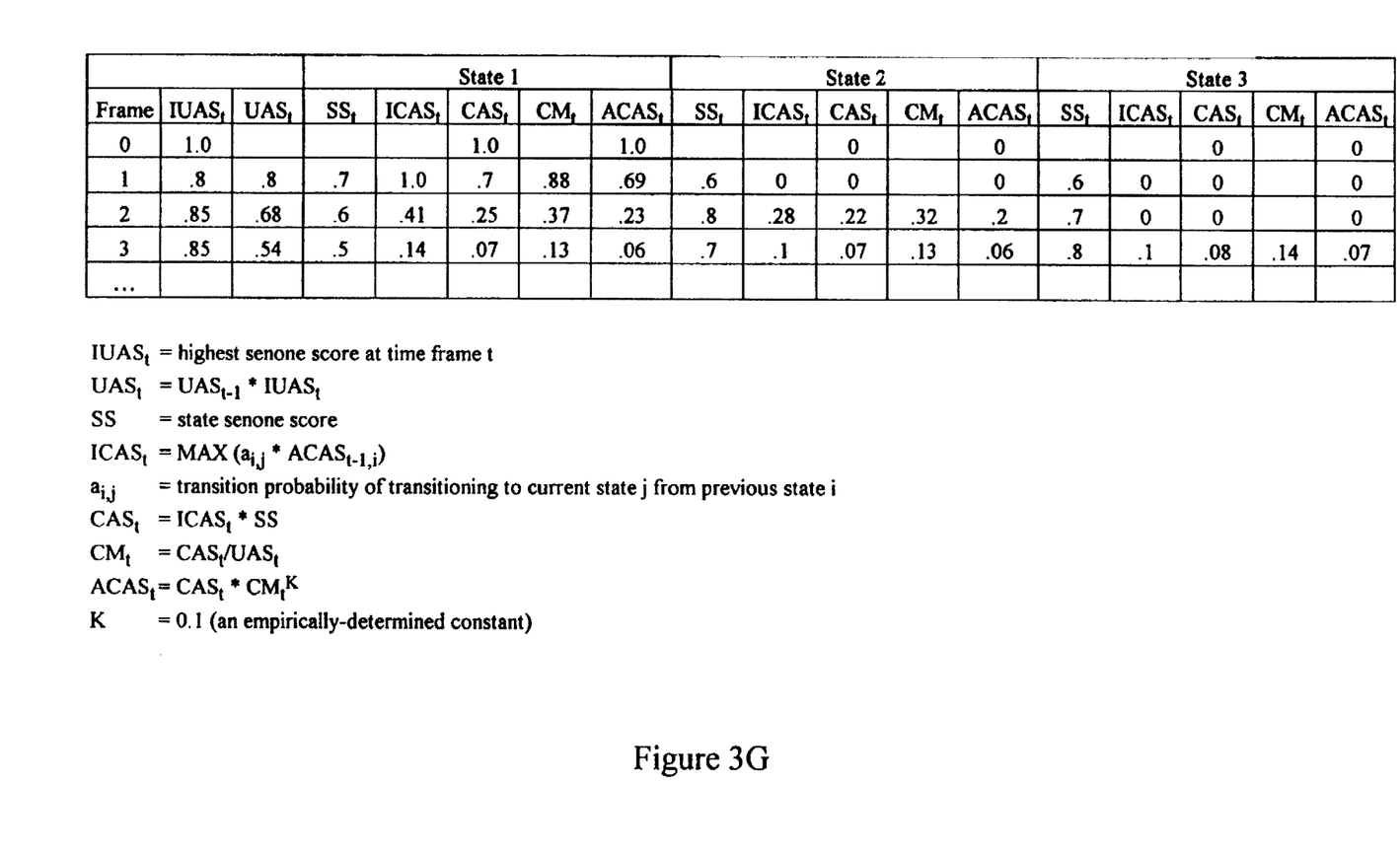
FIG. 3G is a table that shows exemplary values computed to obtain an adjusted constrained acoustic score (ACAS) for each state of a hidden Markov model for each input speech frame.

FIG. 3G is a table that shows exemplary values computed to obtain an adjusted constrained acoustic score (ACAS) for each state of the hidden Markov model for each input speech frame in a preferred embodiment. A separate ACAS is computed for each state of the hidden Markov model so that the method can determine which sequence of states results in the highest ACAS. Whichever state sequence results in the highest ACAS after the last input speech frame for the input utterance is used to compute the combined recognition score for the hidden Markov model.

Table 3G shows exemplary values for an initial time frame zero prior to the receipt of any input speech frames and also shows input speech frames 1–3 of the input speech utterance. At time frame zero the method assumes an incremental unconstrained acoustic score (IUAS) of 1.0 and also assumes a constrained acoustic score (CAS) and an ACAS for state 1 of 1.0. It should be appreciated that although only three input speech frames are shown in FIG. 3G for simplicity, an input speech utterance typically includes many more input speech frames. Similarly, although FIG. 3G shows only three states for the hidden Markov model, the invention also is applicable to hidden Markov models having more or fewer states. It should also be appreciated that the values computed could be scaled to any range suitable for the computing machinery being used as long as the relative magnitude of values is maintained.

For the first input speech frame, the method assumes a 1.0 probability of transitioning into state 1, so the values need only be computed for state 1. The incremental unconstrained acoustic score (IUAS$_t$) refers to the best senone score for each input speech frame t and is computed as discussed above with respect to FIG. 3D and as discussed below with respect to FIG. 5. For the first input speech frame, the IUAS is assumed to equal 0.8 in this example. The unconstrained acoustic score (UAS$_t$) accumulates the incremental unconstrained acoustic score so it is equal to the UAS for the previous input speech frame (t−1) (assumed to be 1.0 for frame zero) multiplied by the IUAS for the current input speech frame t. The state senone score (SS) refers to the probability that the senone associated with the current state (currently state 1) matches the current input speech frame t. The senone score for a senone is computed as discussed above based on the sum of the vector distances between the code words of the senone and the input speech frame multiplied by the statistical variances. The incremental constrained acoustic score (ICAS) is computed as the maximum of a quantity equal to a transition probability ($A_{i,j}$) multiplied by an adjusted constrained acoustic score (ACAS$_{t-1,i}$) for the immediately previous input speech frame (t−1) for a previous state i. The transition probability $A_{i,j}$ is the probability of transitioning from a previous state i to a current state j and is taken from the hidden Markov model shown in FIG. 3D. For the input speech frame 1 and the state 1, the transition probability $A_{i,j}$ is 1.0 and the ACAS for the previous frame zero is also 1.0 which results in an ICAS of 1.0.

As shown above in Equation 3, the adjusted constrained acoustic score (ACAS) is equal to a constrained acoustic score (CAS) times a confidence measure (CM) raised to the power of a constant K. The CAS for a state t equals the ICAS for the state t times the state senone score, so for the input speech frame 1 the CAS equals 0.7 (1.0 times 0.7). The confidence measure equals the constrained acoustic score (CAS) divided by the unconstrained acoustic score (UAS), so for the state 1 the CM equals 0.88 (0.7/0.8). In a preferred embodiment, the constant K equals 0.1 which results in a adjusted constrained acoustic score (ACAS) for state 1 of 0.69.

For the input speech frame 2, the calculations are the same as discussed above for the input speech frame 1 except that a transition can be made from state 1 back to state 1 or from state 1 to state 2. As a result, the method computes values for both state 1 and state 2. The IUAS and the UAS are the same for both states and the IUAS is assumed to be 0.85 which results previous UAS 0.68 (0.85 times the 0.8 for the previous UAS). The ICAS for state 1 equals the transition probability $A_{i,j}$ for the transition from state 1 to state 1 (0.6) times the adjusted constrained acoustic score (ACAS) for the input speech frame 1 (0.69). For state 2, the ICAS equals the transition probability for the transition from state 1 to state 2 (0.4) times the ACAS for state 1 (0.69) which equals 0.28. The rest of the values for states 1 and 2 for the input speech frame 2 are straight forward and result in an ACAS for state 1 of 0.23 and an ACAS for state 2 of 0.2.

The values for the input speech frame 3 are computed similar to the values computed for input speech frames 1 and 2 except that there are more transitions to be considered. For example, the values for state 2 can be computed based on a transition from state 1 to state 2 or a transition from state 2 to state 2. To determine the incremental constrained acoustic score (ICAS) for state 2, the method computes the maximum of the quantity $A_{i,j}$ times ACAS$_{t-1,i}$ for each state transition to state 2. For the transition from state 1 to state 2 the quantity equals 0.4 ($A_{1,2}$) times 0.23 (ACAS$_{t-1,1}$) which equals 0.092 and the quantity for the state transition from state 2 to state 2 equals 0.5 ($A_{2,2}$) times 0.2 (ACAS$_{t-1,2}$) which equals 0.1. The 0.1 for the transition from state 2 to state 2 is greater than the 0.092 for the transition from state 1 to state 2, so the ICAS for state 2 equals 0.1. The rest of the values for input speech frame 3 are straightforward and result in an ACAS for state 1 of 0.06, an ACAS for state 2 of 0.06, and an ACAS for state 3 of 0.07. If the input speech frame 3 were the last input speech frame of the input speech utterance, then the ACAS for the hidden Markov model would be the 0.07 for state 3, because that is the highest ACAS computed for the hidden Markov model.

It has been determined empirically that adjusting the constrained acoustic score dynamically at each frame based on a confidence measure that is computed dynamically at each frame provides about a 20% improvement in recognition accuracy. The confidence measure accentuates the differences between the constrained acoustic scores for respective HMMs by penalizing low constrained acoustic scores more than high constrained acoustic scores. In addition, because the constrained acoustic score is accumulated with each input speech frame and each constrained acoustic score is used to compute subsequent confidence measures, a low constrained acoustic score for one of the first few input speech frames is magnified by the time the constrained acoustic score is computed for the last input speech frame of an input speech utterance.

Figure 4:
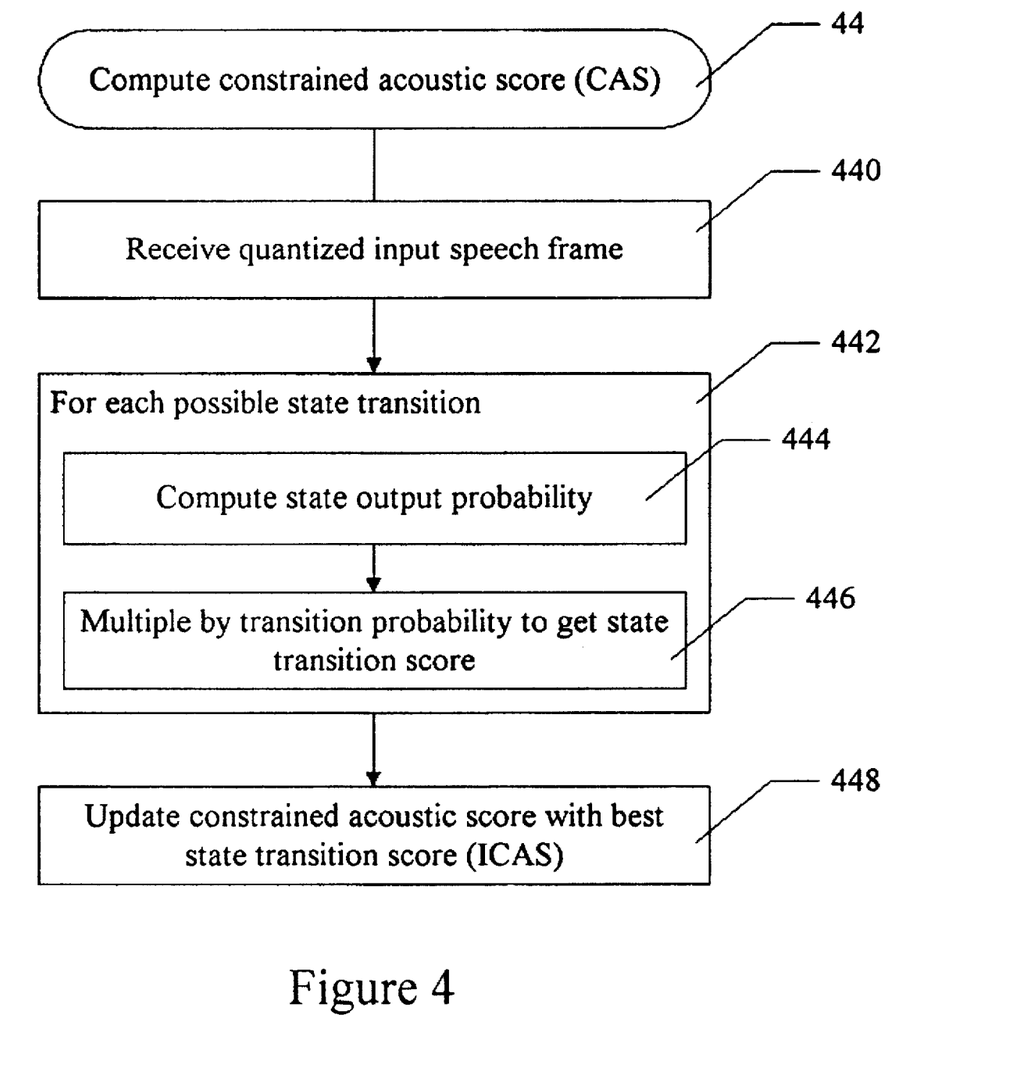
FIG. 4 is a flow diagram showing the details of the step of computing a constrained acoustic score (step 44 from FIG. 2).

FIG. 4 is a flow diagram showing the details of the step of computing a constrained acoustic score (step 44 from FIG. 2). In step 440, the method receives the quantized input speech frame being scored. In step 442, the method performs steps 444 and 446 for each possible state transition from the current state of the current HMM. In step 444, the method computes the state output probability which refers to the probability of the input speech frame being matched by a senone in the state resulting from the state transition. In step 446, the state output probability is multiplied by the transition probability to obtain a state transition score for the state transition. In step 448, the method updates the constrained acoustic score with the best state transition score which is the incremental constrained acoustic score (ICAS).

Figure 5:
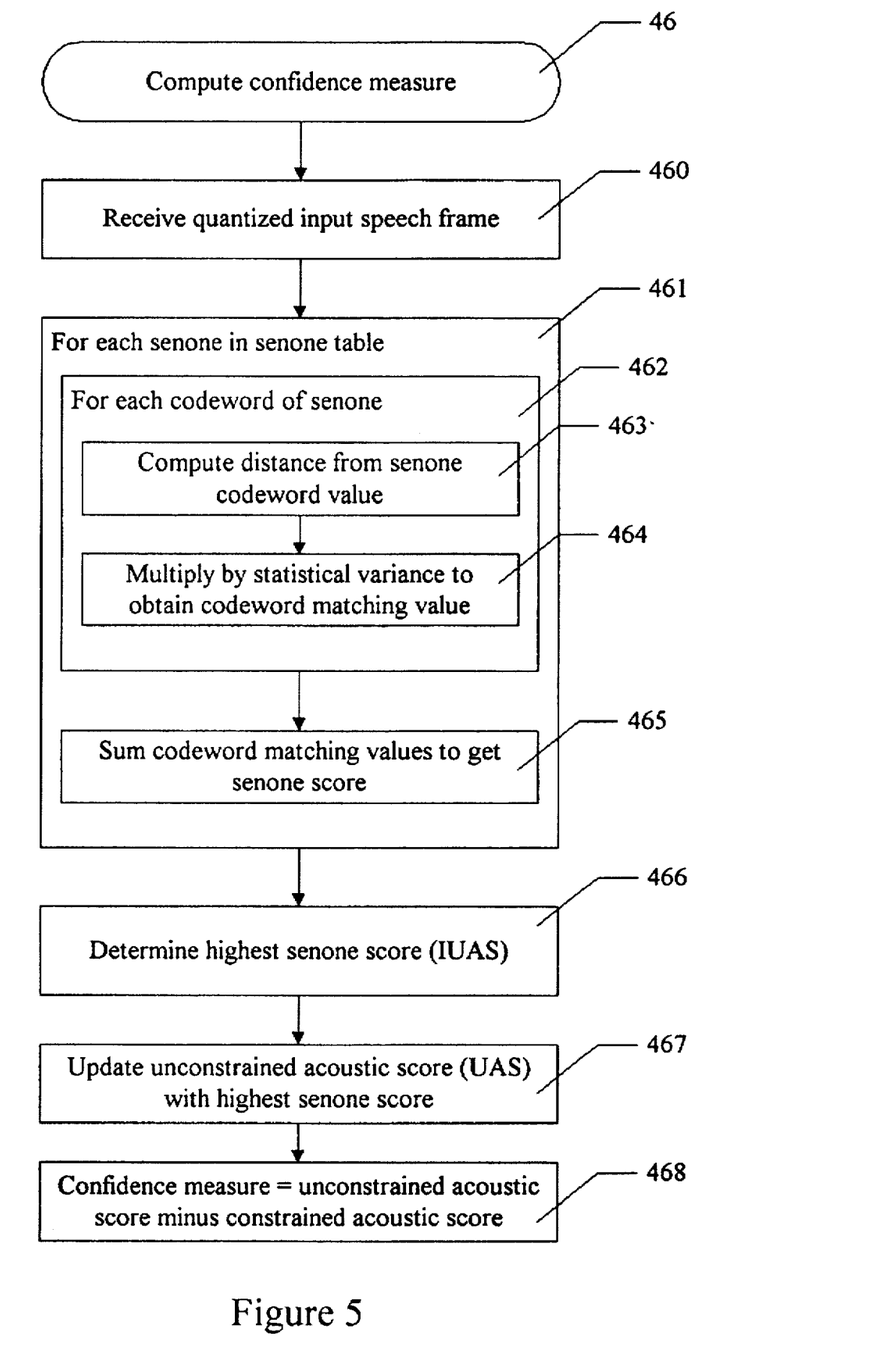
FIG. 5 shows a flow diagram for the step of computing the confidence measure for a particular HMM (step 46).

FIG. 5 shows a flow diagram for the step of computing the confidence measure for a particular HMM (step 46). In step 460, the method receives the quantized input speech frame. In step 461, the method performs steps 462 through 465 to obtain a senone score for each senone in the senone table 26. In step 462, the method performs steps 463 and 464 for each codeword of the senone. In step 463, the method computes the distance from the senone codeword by computing the square of the difference between the senone codeword value and the codeword value for the input speech frame. In step 464, the square of the difference is multiplied by the statistical variance for the senone codeword (as computed based on the training data) to obtain the codeword matching value. In step 465, the 256 codeword matching values are added together to obtain the senone score for the current senone. In step 466, the method determines the highest senone score which becomes the incremental unconstrained acoustic score (IUAS) for the current input speech frame. In step 467, the method updates the unconstrained acoustic score (UAS) with the highest senone score determined in step 466. In step 468, the method computes the confidence measure for the current input speech frame which equals the unconstrained acoustic score minus the constrained acoustic score.

Figure 6:
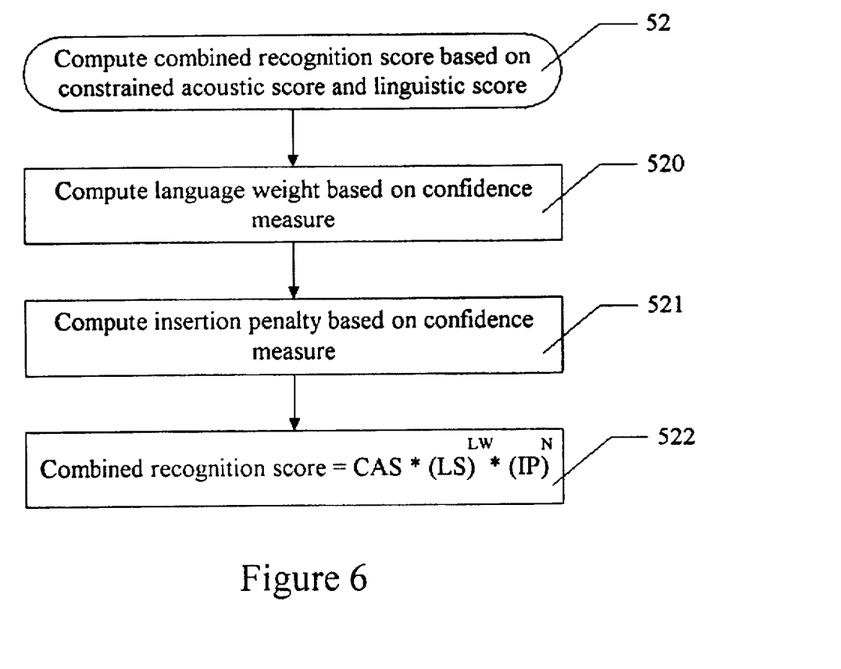
FIG. 6 shows a flow diagram of the step of computing the combined recognition score based on the constrained acoustic score and the linguistic score (step 52).

FIG. 6 shows a flow diagram of the step of computing the combined recognition score based on the constrained acoustic score and the linguistic score (step 52). As discussed above, the combined recognition score is computed based on a modified form of the Bayes formula which is specified in Equation 2. In step 520, the method computes the language weight for the current HMM based on the confidence measure computed with the current input speech frame. In step 521, the method computes the insertion penalty (IP) based on the confidence measure. In step 522, the method computes the combined recognition score based on the modified Bayes formula specified in Equation 2 using the language weight computed in step 520 and the insertion penalty computed in step 522.

The language weight is computed in step 520 using the following Equation 4 where a, b, and γ are constants, CM is the confidence measure, and E(CM) is an expected confidence measure. The expected confidence measure E(CM) is the average confidence measure computed based on the training words used to create the HMM being scored.

$$LW = a - \frac{b-a}{1.0 + e^{(E(CM)-CM)/\gamma}} \quad \text{Equation 4}$$

Figure 7:
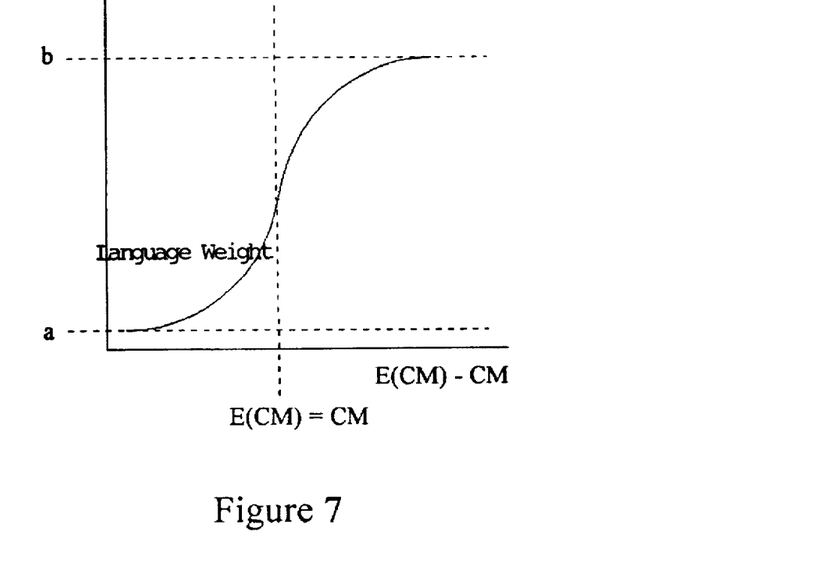
FIG. 7 is a graph showing the relationship between the language weight (Y axis) and the value of the difference between the expected confidence measure E(CM) and the confidence measure CM (X axis).

FIG. 7 is a graph showing the relationship between the language weight (Y axis) and the value of the difference between the expected confidence measure E(CM) and the confidence measure CM (X axis). The function represented in FIG. 7 is known as a sigmoid function that is limited by the constants a and b. Most prior art speech recognizers maintain the language weight to a constant value represented by the point on the sigmoid function at which the expected confidence measure E(CM) equals the computed confidence measure CM. The constant γ of Equation 3 is a function of the slope of the sigmoid function at the point at which the expected confidence measure E(CM) equals the confidence measure CM. The constants a, b, and γ are empirically determined based on the training data and can be easily adjusted up or down to obtain maximum recognition accuracy.

The step of computing an insertion penalty based on the confidence measure (step 521) uses the following Equation 5 where E(LS) is the expected linguistic score, E(LW) is the expected language weight, E(IP) is the expected insertion penalty, and LW is the language weight computed in step 520. The insertion penalty is varied based on the language weight so that the method hypothesizes a constant number of words when a variable language weight is employed.

$$IP = \frac{E(LS)^{E(LW)} \cdot E(IP)}{E(LS)^{LW}} \quad \text{Equation 4}$$

The expected linguistic score E(LS) is the inverse of a concept known as the perplexity of a language model, which refers to the average number of words that can follow a given word in the data set modeled by the language model. Perplexity is discussed in more detail in Lee, *Large-Vocabulary Speaker-Independent Continuous Speech Recognition: The SPHINX System*, Carnegie-Mellon University, 1988, which is set forth below. The expected language weight E(CW is the average language weight computed for the training data used to create the HMM being scored. Similarly, the expected insertion penalty E(IP) is the average language weight computed for the training data used to create the HMM being scored.

Perplexity is a measure of the constraint imposed by the grammar, or the level of uncertainty given the grammar. Before defining perplexity mathematically, let's first consider how a grammar reduces uncertainty during recognition. Without a grammar, the entire vocabulary must be considered at every decision point. With a grammar, it is possible to eliminate many candidates from consideration, or to assign higher probabilities to some candidates than others. This constraint at a decision point (j) can be measured by entropy (H), or the number of bits necessary to specify the next word using an optimal encoding scheme:

$$H(W|j) = - \sum_{w=1}^{v} P(w|j) \cdot \log_2[P(w|j)] \quad \text{(A.1)}$$

The perplexity at the decision point j is defined to be:

$$Q(w|j)=2^{H(w|j)} \quad \text{(A.2)}$$

If we have a finite state grammar with many states, or decision points, then entropy is computed as:

$$H(L) = \sum_j \pi(j)H(W|j) \quad \text{(A.3)}$$

where π(j) is the steady-state probability of being in state j. The per-word perplexity of this language is:

$$Q(L)=2^H(L) \quad \text{(A.4)}$$

The above method for computing entropy and perplexity are useful when the true language model is a finite state grammar with or without probabilities. But in some cases, the true language model is very different from the trigram model used, and its perplexity cannot be measured. In other words, the perplexity measured from the language model does not reflect the uncertainty encountered during recognition. When this is the case, test-set perplexity should be used. Test-set perplexity is simply the geometric mean of probabilities at each decision point for the test set sentences, or:

$$\frac{1}{n} \log P(w_1, w_2, \ldots, w_n) \quad \text{(A.5)}$$

where $P(w_1, w_2, \ldots, w_n)$ is the probability of generating a string of n words. These n words are the concatenation of many sentences, with an end-of-sentence counting as one word. In the case of a bigram grammar, for one sentence:

$$P(w_1,w_2, \ldots, w_m)=P(w_1|\text{Sent–begin}).P(w_2|w_1). \ldots P(\text{Sent–end}|w_m) \quad \text{(A.6)}$$

For tasks whose true language models are known, it can be shown that as the number of test sentences approaches infinity, test-set perplexity (Equation (A.5)) is equivalent to perplexity (Equation (A.4)). However, for tasks whose true language models are not known, test-set perplexity will be higher than perplexity measured from the language model because it is inaccurate. In our word-pair and bigram grammars, the test-set perplexity should be the same as the perplexity measured on the finite state grammars, because the true language models are known. The word-pair grammar has a perplexity of about 60 (which makes sense because there are 57,878 word pairs and 997 words, and 60 is about 57878/997), and the bigram has a perplexity of about 20.

As discussed herein, the present invention provides improvements in speech recognition accuracy by adjusting the combined recognition score based on a confidence measure computed for each input speech frame. The confidence measure is a function of how close a constrained acoustic score for a given Markov model is to an unconstrained acoustic score. The unconstrained acoustic score reflects the probability that the current input speech frame is matched by the closest possible acoustic model (i.e., senone) without regard to any linguistic constraints. In addition, the same confidence measure is used to adjust a language weight that weights a linguistic score with respect to the constrained acoustic score in computing the combined recognition score. Further, an insertion penalty is varied based on the same confidence measure to adjust for the effects caused by varying the language weight.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A computer-implemented method of recognizing an input speech utterance, comprising:

receiving the input speech utterance;

comparing the input speech utterance with a plurality of stored acoustic utterance models, each stored acoustic utterance model corresponding to a linguistic expression, the comparing including an output probability analysis and a transition probability analysis of the input speech utterance with respect to each of the stored acoustic utterance models and resulting in a constrained acoustic score for each of the stored acoustic utterance models;

for each stored acoustic utterance model, computing a confidence measure based on the constrained acoustic score for the stored acoustic utterance model, the confidence measure reflecting a probability that the constrained acoustic score correctly reflects how accurately the stored acoustic utterance model matches the input speech utterance;

for each stored acoustic utterance model, computing a combined score based on the constrained acoustic score and the confidence measure computed for the stored acoustic utterance model; and determining which of the linguistic expressions corresponding to the stored acoustic utterance models most closely matches the input speech utterance based on the combined scores, thereby recognizing the input speech utterance.

2. The method of claim 1, further including:

comparing the input speech utterance with a plurality of context-independent acoustic utterance models without analyzing transition probabilities;

determining which of the context-independent acoustic utterance models most closely matches the input speech utterance, thereby resulting in an unconstrained acoustic score for the most closely matching context-independent acoustic utterance model; and wherein the step of computing a confidence measure for each acoustic utterance model includes computing the confidence measure based on a difference between the constrained acoustic score for the acoustic utterance model and the unconstrained acoustic score.

3. The method of claim 1 wherein the comparing step includes:

for each stored acoustic utterance model, adjusting the constrained acoustic score for the stored acoustic utterance model based on the confidence measure determined for the stored acoustic utterance model.

4. The method of claim 1 wherein the input speech utterance includes a plurality of speech frames and the comparing step includes:

comparing each speech frame of the input speech utterance to each of the stored acoustic utterance models, thereby resulting in an incremental constrained acoustic score for each speech frame and for each stored acoustic utterance model; and summing the incremental constrained acoustic scores to obtain the constrained acoustic score.

5. The method of claim 1, further comprising:

for each stored acoustic utterance model, computing a linguistic score that reflects a probability that the stored acoustic utterance model corresponds to a linguistic model in a stored lexicon of linguistic models; and wherein the step of computing a combined score for each stored acoustic utterance model includes computing the combined score based on the linguistic score and a language weight that is varied based on the confidence measure computed for the stored acoustic utterance model.

6. The method of claim 1, further including:

for each stored acoustic utterance model:

penalizing the combined score by an insertion penalty that is adjusted based on how many words there are in the linguistic expression corresponding to the stored acoustic utterance model; and adjusting the insertion penalty based on the confidence measure computed for the stored acoustic utterance model.

7. A computer-implemented method of recognizing an input speech utterance that includes a sequence of input speech frames, the method comprising:

receiving the sequence of input speech frames;

for each input speech frame:

comparing the input speech frame to a plurality of acoustic hidden Markov models, each hidden Markov model corresponding to a linguistic expression, the comparing including an output probability analysis and a transition probability analysis of the input speech frame with respect to each of the hidden Markov models and resulting in a constrained acoustic scored for each of the hidden Markov models; and for each hidden Markov model:

computing a confidence measure based on the constrained acoustic score for the hidden Markov model, the confidence measure reflecting a probability that the constrained acoustic score correctly reflects how accurately the hidden Markov model matches the input speech frame;

adjusting the constrained acoustic score for the hidden Markov model based on the confidence measure computed for the hidden Markov model; and determining which of the linguistic expressions corresponding to the hidden Markov models most closely matches the input speech utterance based on the adjusted constrained acoustic scores, thereby recognizing the input speech utterance.

8. The method of claim 7, further including:

for each input speech frame:
  comparing the input speech frame with a plurality of context-independent acoustic utterance models without analyzing transition probabilities;
  determining which of the context independent acoustic utterance models most closely matches the input speech frame, thereby resulting in an unconstrained acoustic score for the most closely matching context independent acoustic utterance model; and
  wherein the step of computing a confidence measure for each hidden Markov model includes computing the confidence measure based on a difference between the constrained acoustic score for the hidden Markov model and the unconstrained acoustic score.

9. The method of claim 7, further including, for each hidden Markov model, computing a combined score based on a language weight that is varied based on the confidence measures computed for the hidden Markov model.

10. The method of claim 7, further including:
  for each hidden Markov model:
    penalizing the combined score by an insertion penalty that is adjusted based on how many words there are in the linguistic expression corresponding to the hidden Markov model; and
    adjusting the insertion penalty based on the confidence measure computed for the hidden Markov model.

11. A computer system for recognizing an input speech utterance that includes a sequence of input speech frames, the system comprising:
  a hidden Markov model storage unit storing a plurality of context-dependent hidden Markov models, each hidden Markov model corresponding to a linguistic expression;
  a context-independent acoustic model storage unit storing a plurality of context-independent acoustic models;
  means for comparing the sequence of input speech frames to the hidden Markov models, including means for performing an output probability analysis and means for performing a transition probability analysis of the sequence of input speech frames with respect to each of the hidden Markov models and resulting in a constrained acoustic scored for each of the hidden Markov models; and
  means for comparing each input speech frame to the context-independent acoustic models, for computing an incremental unconstrained acoustic score for each input speech frame that reflects a probability that the input frame matches whichever context-independent acoustic model most closely matches the input speech frame, and for accumulating the incremental unconstrained acoustic scores into a unconstrained acoustic score for the sequence of input speech frames;
  means for computing a confidence measure for each hidden Markov model based on a difference between the constrained acoustic score for the hidden Markov model and the unconstrained acoustic score;
  means for adjusting the constrained acoustic score for each hidden Markov model based on the confidence measure computed for the hidden Markov model; and
  means for determining which of the linguistic expressions corresponding to the hidden Markov models most closely matches the input speech utterance based on the adjusted constrained acoustic scores, thereby recognizing the input speech utterance.

12. The system of claim 11 wherein the means for determining includes means that, for each hidden Markov model, computes a combined score based on a language weight that is varied based on the confidence measure computed for the hidden Markov model, and the means for determining further includes means for determining which of the hidden Markov models has the highest combined score and for recognizing the linguistic expression associated with the hidden Markov model with the highest combined score as the input speech utterance.

13. The system of claim 12, further including:
  means that, for each of the hidden Markov models, computes a separate insertion penalty based on the confidence measure computed for the hidden Markov model; and
  means that, for each of the hidden Markov models, penalizes the combined score for the hidden Markov model by the insertion penalty computed for the hidden Markov model.

14. The method of claim 1 wherein each stored acoustic utterance model is a hidden Markov model.

15. The method of claim 1, further comprising:
  for each stored acoustic utterance model, computing a linguistic score that reflects a probability that the stored acoustic utterance model corresponds to a linguistic model in a stored lexicon of linguistic models; and
  wherein the step of computing a combined score for each stored acoustic utterance model includes computing the combined score based on the linguistic score and a language weight computed for the stored acoustic utterance model.

16. The method of claim 1 wherein the step of computing a combined score for each stored acoustic utterance model includes, for each stored acoustic utterance model, computing the combined score based on a language weight that is varied based on the confidence measure computed for the stored acoustic utterance model.

17. The method of claim 7, further comprising:
  for each hidden Markov model, computing a linguistic score that reflects a probability that the hidden Markov model corresponds to a linguistic model in a stored lexicon of linguistic models; and
  computing a combined score for each hidden Markov model based on the linguistic score and a language weight computed for the hidden Markov model.

18. The method of claim 7, further comprising:
  for each input speech frame and for each hidden Markov model:
    computing a language weight based on the confidence measure computed for the hidden Markov model for the input speech frame;
    computing a linguistic score that reflects a probability that the hidden Markov model corresponds to a linguistic model in a stored lexicon of linguistic models; and
    computing an incremental combined score based on the adjusted constrained acoustic score, the linguistic score and the language weight computed for the hidden Markov model for the input speech frame; and
  for each hidden Markov model, summing the incremental combined acoustic scores computed for the hidden Markov model to obtain a total combined acoustic score for the hidden Markov model; wherein the determining step includes recognizing the input speech utterance based on the total combined acoustic scores computed for the hidden Markov models.

19. A computer-implemented method of recognizing an input speech utterance, comprising:

receiving the input speech utterance;

for each of a plurality of stored acoustic utterance models, computing a context-based constrained acoustic score based on context information of the stored acoustic utterance model, each stored acoustic utterance model corresponding to a linguistic expression;

for each stored acoustic utterance model, computing a confidence measure based on the constrained acoustic score for the stored acoustic utterance model, the confidence measure reflecting a probability that the constrained acoustic score correctly reflects how accurately the stored acoustic utterance model matches the input speech utterance;

for each stored acoustic utterance model, computing a combined score based on the constrained acoustic score and the confidence measure computed for the stored acoustic utterance model; and determining which of the linguistic expressions corresponding to the stored acoustic utterance models most closely matches the input speech utterance based on the combined scores, thereby recognizing the input speech utterance.

20. The method of claim 19, further including:

computing an unconstrained acoustic score for the input speech utterance without regard for the context information of the stored acoustic utterance models; and wherein the step of computing a confidence measure for each acoustic utterance model includes computing the confidence measure based on a difference between the constrained acoustic score for the acoustic utterance model and the unconstrained acoustic score.

21. A computer-implemented method of recognizing an input speech utterance, comprising:

receiving the input speech utterance;

for each of a plurality of stored acoustic utterance models, computing a context-based constrained acoustic score based on context information of the stored acoustic utterance model, each stored acoustic utterance model corresponding to a linguistic expression;

computing an unconstrained acoustic score for the input speech utterance without regard for the context information of the stored acoustic utterance models;

for each stored acoustic utterance model, computing a confidence measure based on the unconstrained acoustic score and the constrained acoustic score for the stored acoustic utterance model, the confidence measure reflecting a probability that the constrained acoustic score correctly reflects how accurately the stored acoustic utterance model matches the input speech utterance;

for each stored acoustic utterance model, adjusting the constrained acoustic score for the stored acoustic utterance model based on the confidence measure determined for the stored acoustic utterance model; and determining which of the linguistic expressions corresponding to the stored acoustic utterance models most closely matches the input speech utterance based on the constrained acoustic scores, thereby recognizing the input speech utterance.

22. The method of claim 21, further comprising:

for each stored acoustic utterance model, computing a linguistic score that reflects a probability that the stored acoustic utterance model corresponds to a linguistic model in a stored lexicon of linguistic models; and for each stored acoustic utterance model, computing a combined score based on the constrained acoustic score and the linguistic score computed for the stored acoustic utterance model and on a language weight that is varied based on the confidence measure computed for the stored acoustic utterance model.

23. A computer storage medium for controlling a computer to recognize an input speech utterance received by the computer, the storage medium comprising:

a plurality of acoustic utterance models, each acoustic utterance model corresponding to a linguistic expression;

computer instructions for comparing the input speech utterance with each of the acoustic utterance models to obtain a constrained acoustic score for each of the acoustic utterance models;

computer instructions that, for each of the acoustic utterance models, causes the computer to compute a confidence measure based on the constrained acoustic score for the stored acoustic utterance model, the confidence measure reflecting a probability that the constrained acoustic score correctly reflects how accurately the acoustic utterance model matches the input speech utterance;

computer instructions that, for each of the acoustic utterance models, causes the computer to compute a combined score based on the constrained acoustic score and the confidence measure computed for the acoustic utterance model; and computer instructions for determining which of the linguistic expressions corresponding to the acoustic utterance models most closely matches the input speech utterance based on the combined scores, thereby recognizing the input speech utterance.

24. The storage medium of claim 23 wherein each acoustic utterance model is a hidden Markov model.

25. The storage medium of claim 23, further including:

a plurality of context-independent acoustic utterance models;

computer instructions for comparing the input speech utterance with each of the context-independent acoustic utterance models;

computer instructions for determining which of the context-independent acoustic utterance models most closely matches the input speech utterance, thereby resulting in an unconstrained acoustic score for the most closely matching context-independent acoustic utterance model; and wherein the computer instructions that cause the computer to compute the confidence measure for each acoustic utterance model include computer instructions for computing the confidence measure based on a difference between the constrained acoustic score for the acoustic utterance model and the unconstrained acoustic score.

26. The storage medium of claim 23, further including:

computer instructions that, for each acoustic utterance model, cause the computer to adjust the constrained acoustic score for the acoustic utterance model based on the confidence measure determined for the acoustic utterance model.

27. The storage medium of claim 23 wherein the input speech utterance includes a plurality of speech frames and the computer instructions for comparing include:

computer instructions for comparing each speech frame of the input speech utterance to each of the acoustic utterance models, thereby resulting in an incremental constrained acoustic score for each speech frame and for each of the acoustic utterance models; and computer instructions that, for each of the acoustic utterance models, causes the computer to sum the incremental constrained acoustic scores computed for the acoustic utterance model and thereby obtain the constrained acoustic score for the acoustic utterance model.

28. The storage medium of claim 23, further comprising:

a lexicon that includes a plurality of linguistic models;

computer instructions that, for each of the acoustic utterance models, causes the computer to compute a linguistic score that reflects a probability that the acoustic utterance model corresponds to one of the linguistic models in the lexicon; and wherein the computer instructions that cause the computer to compute combined scores includes computer instructions that, for each of the acoustic utterance models, causes the computer to compute the combined score for the acoustic utterance model based on the linguistic score computed for the acoustic utterance model and a language weight computed for the acoustic utterance model.

29. The storage medium of claim 23 wherein the computer instructions for causing the computer to compute a combined score for each of the acoustic utterance models include computer instructions that, for each of the acoustic utterance models, causes the computer to compute the combined score for the acoustic utterance model based on a language weight that is varied based on the confidence measure computed for the acoustic utterance model.

30. The storage medium of claim 23, further comprising:

computer instructions that, for each of the acoustic utterance models:

computes an insertion penalty based on the confidence measure computed for the acoustic utterance model; and adjusts the combined score using the insertion penalty computed for the acoustic utterance model.

* * * * *